(12) United States Patent
Pavone

(10) Patent No.: US 7,390,412 B2
(45) Date of Patent: Jun. 24, 2008

(54) METHOD OF MANAGING THE VALVES OF A SIMULATED MOVING BED SEPARATION SYSTEM

(75) Inventor: Didier Pavone, Ecully (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 469 days.

(21) Appl. No.: 10/867,790

(22) Filed: Jun. 16, 2004

(65) Prior Publication Data

US 2004/0256323 A1    Dec. 23, 2004

(30) Foreign Application Priority Data

Jun. 17, 2003    (FR) .................................. 03 07300

(51) Int. Cl.
*B01D 15/08*    (2006.01)
(52) U.S. Cl. ............................. 210/659; 137/8; 210/662; 585/825
(58) Field of Classification Search ............. 210/198.2, 210/656, 659, 662; 585/821, 825; 137/8, 137/624.18
See application file for complete search history.

(56) References Cited

U.S. PATENT DOCUMENTS 3,268,605 A * 8/1966 Boyd, Jr. .................... 585/821
5,114,590 A    5/1992 Hotier
5,422,007 A    6/1995 Nicoud et al.
5,582,736 A * 12/1996 Hotier et al. ................ 210/659
5,762,806 A * 6/1998 Hotier ......................... 210/659
6,063,285 A * 5/2000 Hotier et al. ................ 210/659

FOREIGN PATENT DOCUMENTS

EP    0 679 421 A1    5/2000
FR    2 785 196    11/1995

* cited by examiner

*Primary Examiner*—Joseph W Drodge
(74) *Attorney, Agent, or Firm*—Antonelli, Terry, Stout & Kraus, LLP.

(57) ABSTRACT

A method of managing the valves of a simulated moving bed separation system comprising at least one column of adsorbent beds split into several zones delimited by injection and draw-off points, allowing finer monitoring of a determined concentration profile. The method comprises, during each period between the shift times of the injection and draw-off points, in opening and closing a first valve located at one end of a zone according to a determined law, while opening and closing the valve downstream from the first valve in relation to the direction of flow of the recirculation flow, according to the same law with a lag, referred to as overlap time, in relation to the first valve, which is less than or equal to the period, the law imposing a constant total flow rate for the flow passing through the two consecutive valves throughout the overlap time. Applications are any simulated moving bed separation system, preferably those used for relatively small-tonnage production such as fine petrochemistry, pharmaceutical industry, certain food processing industries, etc.

42 Claims, 2 Drawing Sheets

METHOD OF MANAGING THE VALVES OF A SIMULATED MOVING BED SEPARATION SYSTEM

BACKGROUND OF THE INVENTION

1. Field of the Invention

The invention relates to a method of managing the valves of a simulated moving bed separation system, allowing finer monitoring of a determined concentration profile.

2. Description of the Prior Art

As already described in French patent 2,762,793 filed by the assignee, a simulated moving bed (SMB in abbreviated form) separation system, also referred to as simulated countercurrent (SCC in abbreviated form) separation system, comprises (FIG. 1) a series of beds filled with adsorbent which are arranged in a closed loop. A fluid circulation is established through this loop. The loop or column is divided into a succession of zones (Z1 ... Z4), generally four, each zone consisting of a certain number of beds. Lines are connected to the loop between the various zones, allowing injection of a feedstock (A+B) at least one of the components of which is to be separated and of an eluent (S) which mainly contains the desorbent, or draw-off of an extract (Ex) which mainly contains the preferably adsorbed component or of a raffinate (Raf) which mainly consists of the least preferably adsorbed elements.

The term adsorbent is used here in its most general sense. It can be an adsorbent such as a molecular sieve, zeolitic for example, or an adsorbent of ion-exchange resin type.

The extract can contain, in addition to the preferably adsorbed product, other products circulating in the column that will have to be separated in distillation columns outside the adsorption column, thus allowing obtaining the product or products at the required purity level.

In the case of a real countercurrent (RCC) separation system, a fixed and constant concentration profile develops along separation column 1. The position of the injection points of feedstock A+B, of eluent S, and of the draw-off points of extract Ex and of a raffinate Raf remains fixed. Adsorbent solid 3 and fluids 2 circulate in a countercurrent flow. A solid driving system and a recycle pump P, both arranged on the location of the column (at the junction of zones Z1 and Z4 where the only species present, in the liquid as well as in the solid, is the eluent), respectively allow sending the solid back from the base to the top, and conversely the liquid from the top to the base.

In the case of a simulated countercurrent (SCC) separation system, the injection points of the feedstock and of the eluent and the draw-off points of the raffinate and of the extract are periodically moved forward in the direction of circulation of the fluids. All of the injection and draw-off points move forward at each period by the same increment of a length equal to one bed, so that the length of each zone or, which is equivalent, the number of beds per zone, remains unchanged.

A concentration profile of the various species present, which is going to move along the loop mainly according to the recirculation flow which is entirely recycled to the top or to the bottom of the column depending on the direction of circulation selected, generally from the top of the column downwards, is established in the column.

All the injection and draw-off lines of a connection separating two consecutive zones are thus shifted simultaneously at each period $\Delta T$ upwards or downwards according to the direction of circulation of the recirculation flow, and after a certain time called cycle time, they are back in their initial position.

If all the connections are numbered from 1 to N, for example from the top to the bottom of the column, the position of the feedstock and eluent injection points and of the raffinate and extract draw-off points can be defined at each period by assigning to each flow the number of the connection corresponding thereto.

For example, S (1)/Ext (5)/Feedstock (9)/Raff (13) means that the feedstock is injected at connection 9, that eluent S is injected at connection 1, that raffinate Raf is drawn off at connection 13 and that extract Ex is drawn off at connection 5.

The column diagrammatically shown in FIG. 1 comprises 15 connections, delimiting 15 beds, and each connection is provided with at least one injection line and at least one draw-off line.

At the time $T_0$, the positions of the eluent, of the extract, of the feedstock and of the raffinate are thus: 1, 5, 9, 13. At the time $T_0+\Delta T$, the positions all increase by one increment and respectively become 2, 6, 10, 14, at the time $T_0+2^*\Delta T$, they become 3, 7, 11, 15, etc. It is understood that, after the time $T=T_0+15\Delta T$, the positions of the injection points and of the draw-off points are back in their initial position.

The number of beds assigned to each zone can also be determined. Zone 1 being defined as located between the eluent injection line and the extract draw-off line therefore comprises 5−1=4 beds. Similarly, zone 2 is defined as located between the extract draw-off line and the feedstock injection line, and comprises 9−5=4 beds. Zone 3 is defined as located between the feedstock injection line and the raffinate draw-off line and comprises 13−9=4 beds. Zone 4 is defined as located between the raffinate draw-off line and the eluent injection line and comprises 3 beds.

In brief, the characteristics of a simulated moving bed are defined by the zones which comprise each a determined and whole number of beds, and a synchronized displacement by one bed at each period $\Delta T$ of all the injection and draw-off lines, which allows to maintain the length of each zone constant.

Selection of the period $\Delta T$ and of the injection and draw-off flow rates is determined so as to maximize the purity of the product to be upgraded at a given yield, or conversely to maximize the yield for a fixed purity as described in the aforementioned French patent 2,762,793.

A SCC separation system has two drawbacks inherent in the concept of simulated moving bed which causes continuous displacement of the concentration profiles of the various species present in the column in relation to the RCC system wherein these profiles would be stationary:

1) the length of a zone can only be a whole number of beds because a zone is precisely defined by the connections that surround it, therefore by the number of beds contained between said connections, and 2) during the draw-off period, the profile moves before the draw-off point by the length of a bed, which leads to draw off over a certain length of a bed around the optimum point, without being permanently on this optimum point precisely, as it would be the case with a RCC since the profiles are stationary in this case.

French patent 2,785,196 1 (EP-1,128,881) filed by the assignee describes a method allowing improvement of the purity of the raffinate or of the extract by dividing the position shift period into several subperiods during which the length of certain zones can vary.

In each subperiod, a zone has a decreased length and another zone has a length increased by the same quantity, so that the total length of the zones or length of the column remains the same.

At the next subperiod, the zone whose length has been decreased remains the same, but the zone whose length has been increased moves forward to become the immediately consecutive zone in the direction of flow of the fluids in the loop, and so forth up to the initial situation at the end of the period.

Everything goes off as if, over the period, the column had worked on average with zones of lengths different from their physical lengths. During the period, it is therefore all of the connections that are concerned by the displacement of the injection and draw-off points, which in practice leads to an extremely delicate and high-frequency management of the valves controlling injection and draw-off.

Furthermore, the method of operation described in the aforementioned French patent 2,785,196 is based on a completely separate opening and closing of the consecutive valves insofar as there is no temporal overlap. Each injection (respectively each draw-off) is carried out through a single injection (respectively draw-off) point.

French patent 2,721,528 and corresponding U.S. Pat. No. 5,578,215 describes a method allowing improvement of the purity of the raffinate or of the extract by slightly changing the shift period of the injection or draw-off positions of each bed in relation to a fixed value $\Delta T$ so as to take account of the molecular sieve filling differences of each bed or of the adsorbent phase quantity differences from one bed to the next.

The method described in this patent permutates the injection and draw-off streams independently of one another and at programmed time intervals so that, after N permutations, each stream has passed through the whole of the closed loop.

SUMMARY OF THE INVENTION

The method according to the invention allows simulated operation of a simulated moving bed separation loop with a non-whole number of beds in each zone and/or finer monitoring of the concentration profile, which allows substantially increasing the purity of the raffinate and/or of the extract.

The method is based on the observation that, during operation of a simulated moving bed separation unit, at the time when feedstock is for example injected onto a bed $N_2$ and extract is drawn off from bed $N_1$ located above bed $N_2$ ($N_2 > N_1$ since the beds are numbered according to the direction of flow of the recirculation flow), the length of the corresponding zone being thus $L = N_2 - N_1$, if 50% of the extract is drawn off from bed $N_1$ and 50% of the extract from the bed located immediately above $N_1 - 1$ for example, the zone considered is fictitiously assigned the length $N_2 - N_1 + 0.5$.

In fact, 50% of the total extract flow has been simultaneously drawn off in zones of length L and L+1 respectively by drawing off no longer on bed $N_1$ alone but on bed $N_1$ and the bed located immediately above $N_1 - 1$, which amounts to drawing off the whole of the extract flow on a zone whose length is halfway between L and L+1, i.e. to simulating a zone length L+0.5.

This process can be readily generalized. If simulation of a zone of length between L and L+1 is desired, for example a zone of length L+1-X (with X a fractional number ranging between 0 and 1, since two immediately consecutive draw-off (or withdrawal) points are always separated by the length of a bed), the draw-off flow rate Q X has to be applied at the end where the fluid is drawn off in the zone considered and, at the immediately consecutive end located above the zone considered, the draw-off flow rate Q(1-X) has to be applied for a total draw-off flow rate Q during the period considered.

The method thus obtains a non-whole zone length by playing on the draw-off flow rates in the two consecutive draw-off lines.

The process would be exactly the same for an injection.

Another essential basis on which the method is based combines the actions carried out on two immediately consecutive draw-off (or injection) valves, so as to introduce an overlap.

In the text hereafter, the terms first and second valve respectively refer to the valve corresponding to the connection of rank N and to the valve of same type (draw-off or injection) corresponding to the downstream connection of rank N+1 in the direction of flow of the recirculation flow.

According to a first variant of the method, a certain flow rate distribution is applied to two immediately consecutive valves, for example 30% for the first valve located at end N, and 70% for the second valve located at end N+1, and the opening degree of the valves does not vary during the draw-off period so as to maintain the flow rate distribution throughout period $\Delta T$.

In a second variant of the method, the notion of overlap time during the period for each valve is introduced, i.e. at a given time of the period, two consecutive valves can be partly open.

The overlap time between the two valves is precisely defined as the time during which the two valves are simultaneously open whatever the opening degree of each one. This overlap time is always less than or equal to the period and is defined by a fraction of the period. In some cases, it can be equal to the period itself.

The method according to the invention allows managing the opening of valves of a simulated moving bed component separation system working under closed loop conditions with optimized flow rates (the recirculation and extract flow rates can be optimized for example by means of the method described in the aforementioned French patent 2,801,225). This system comprises at least one column of a succession of beds laden with adsorbent solid, each bed being provided with connections for at least one draw-off valve and at least one injection valve. The column has at least one feed point for a feedstock containing the components to be separated, an extract draw-off point, a raffinate draw-off point and an eluent injection point, and it is subdivided into several zones each comprising several beds, each zone being defined any time by the position of the injection point and of the draw-off point surrounding the zone, and all of the draw-off and injection points move forward by one bed at predetermined time intervals called periods.

The method is characterized in that, during each period, the valve located at one end of a zone, referred to as first valve, opens and closes according to a determined law, while the immediately consecutive valve in the direction of flow of the recirculation flow opens and closes according to the same law with a lag referred to as overlap time in relation to the first valve, which is less than or equal to the period.

The valve opening and closing law is such that the sum of the flow rates passing through two consecutive valves is always constant.

The overlap time of two consecutive valves can range between 0.05 and 1×the period, preferably between 0.2 and 1×the period.

The valves used at each connection can be "on-off" valves, but flow valves are preferably used. The invention is not linked with a particular valve technology and can be used for any type of valves provided with a programmable actuator allowing defining a determined opening/closing law.

According to a first implementation mode, the opening and closing law for each valve can, in some cases, have a two-stage profile (as shown in FIG. 2), a first linear opening stage, or of the first order or of a higher order whose duration is 1×the period, and a second linear closing stage, or of the first order or of a higher order whose duration is 1×the period. The overlap time (TR) between two consecutive valves is then one period.

According to another implementation mode, the opening/closing law for each valve can have a three-stage profile (as shown in FIG. 3), a first opening stage, or of the first order or of a higher order (DT1) whose duration ranges between 0.4 and 0.9×the period, a second total opening stage (DT2) of the valve ranging between 0.6 and 0.1×the period, and a third linear closing stage (DT3), or of the first order or of a higher order whose duration is equal to first stage (DT1). The overlap time (TR) between two consecutive valves is then DT1=DT3, i.e. between 0.4 and 0.9×the period.

The opening and closing law of each valve can be a law of the first order characterized by the time required to obtain 99% of the total opening, and this time can range from 0.1 to 0.98×the period, preferably from 0.2 to 0.95×the period.

The method according to the invention can be applied to any type of simulated moving bed separation system, for example for separation of aromatic hydrocarbons with eight carbon atoms.

With the method according to the invention, a connection is established between the operation of the simulated countercurrent (SCC) system and of a real countercurrent (RCC) system.

Unlike the method described in the aforementioned French patent 2,721,528, the draw-off and injection points of a given connection are not treated independently, but associated in groups of two as explained in detail hereafter.

The method according to the invention substantially corrects the drawbacks mentioned above under points 1) and 2). In fact, it allows simulated zone lengths of a non-whole number of beds and thus to better locate the injection and draw-off points, and on the other hand to better monitor the concentration profile, which allows to improve the purity of the wanted product.

In fact, in simulated countercurrent (SCC), the draw-off and injection points are discretely distributed along the column and the profile moves along. While a valve is open, the profile moves before it and the draw-off (or injection) point it represents thus travels a certain portion of the concentration profile.

The present invention, by carrying out the opening no longer on a single valve, as in the prior art, but on two consecutive valves, allows finer monitoring of the concentration profile.

BRIEF DESCRIPTION OF THE DRAWINGS

Other features and advantages of the method and of the device according to the invention will be clear from reading the description hereafter of a non limitative embodiment example, with reference to the accompanying drawings wherein.

DETAILED DESCRIPTION OF THE INVENTION

The present invention constitutes an improvement of the simulated moving bed units control method described in the aforementioned French patents 2,762,196 and 2,801,225. In particular for a given feedstock and eluent flow rate and for extract and raffinate flow rates linked by the material balance, the recirculation and extract flow rates must have an optimized value according to the method described in French patent 2,801,225. In particular, the term optimized recirculation flow rate therefore refers to the method described in French patent 2,801,225.

It is furthermore important that the present invention is not linked with a determined valve technology, and that it can be applied to any type of valve provided with an actuator allowing automatic opening and closing control according to a determined law.

The term automatic control refers to a programmer that can reach a predetermined opening level (for example 99% of the total opening) within a determined time corresponding to a fraction of the period.

In practice, each connection comprises at least one draw-off valve and one injection valve. To simplify the presentation, the group of two valves of the same type (injection or draw-off) concerned by the shifted opening and closing operations is referred to as consecutive valves.

In a first variant of the invention, a flow control device controls the flow rate passing through each valve, and this flow rate can thus be controlled by opening the valves, during the same period $\Delta T$, with flow rate $Q \cdot X$ for the first valve and flow rate $Q \cdot (1-X)$ for the second valve.

In a second variant of the invention, the flows drawn off at the two consecutive valves are controlled in such a way that closing of the first valve occurs partly simultaneously with opening of the second valve. The time during which two consecutive valves are partly open simultaneously is referred to as overlap time. This overlap time is generally less than the period, but it can in some cases be equal to the period.

There is an unlimited number of opening and closing laws for each valve.

Figure 1:
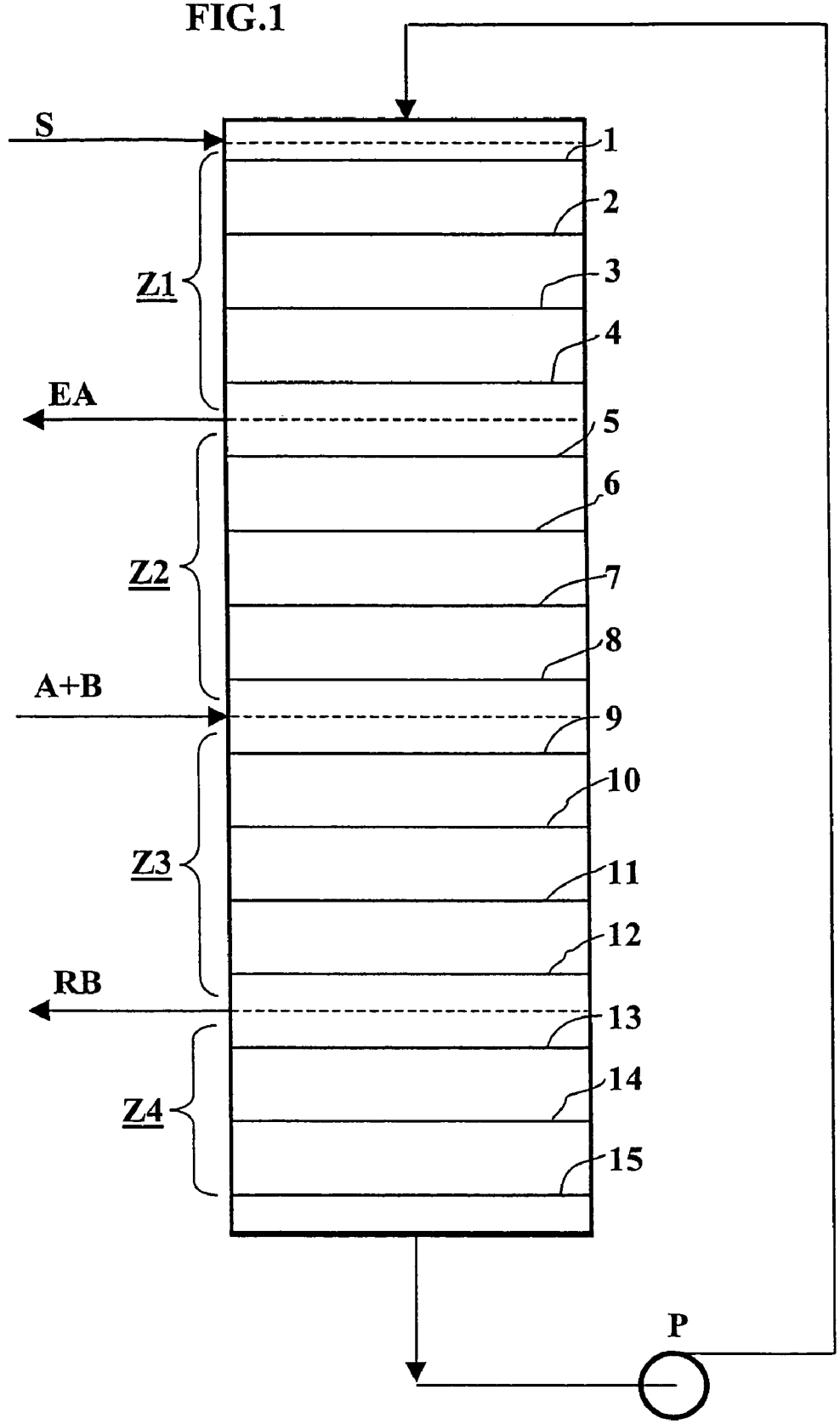
FIG. 1 diagrammatically shows an example of a simulated moving bed separation unit with four zones, allowing showing the fluids injected and drawn off, and the recirculation flow rate, as well as the beds numbering and the zones definition.
Figure 2:
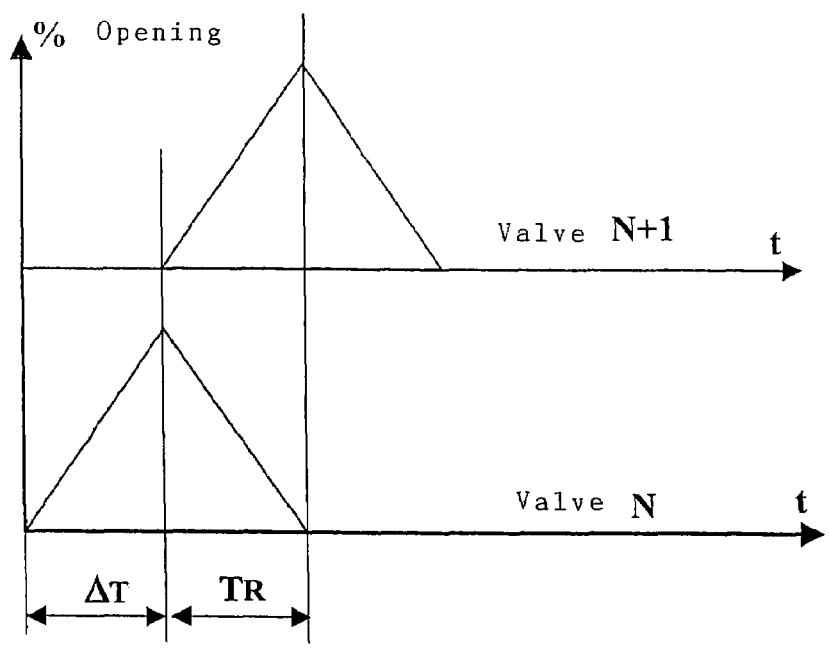
FIG. 2 shows an example of operation of a unit, the valves having a linear opening/closing law referred to as "triangle" law.

A triangle law allowing good understanding of the variant described can be considered for example. This variant is illustrated by FIG. 2. The first valve opens linearly during a period and, during the next period, the first valve closes linearly. This is the triangle opening/closing law. During the period where the first valve closes, the second valve opens linearly and, during the next period, said second valve closes linearly.

During this operation, there is an overlap of a period during which the first valve closes while the consecutive valve opens. The total opening time for the two valves is in this case two periods.

Other opening/closing laws are of course possible.

Figure 3:
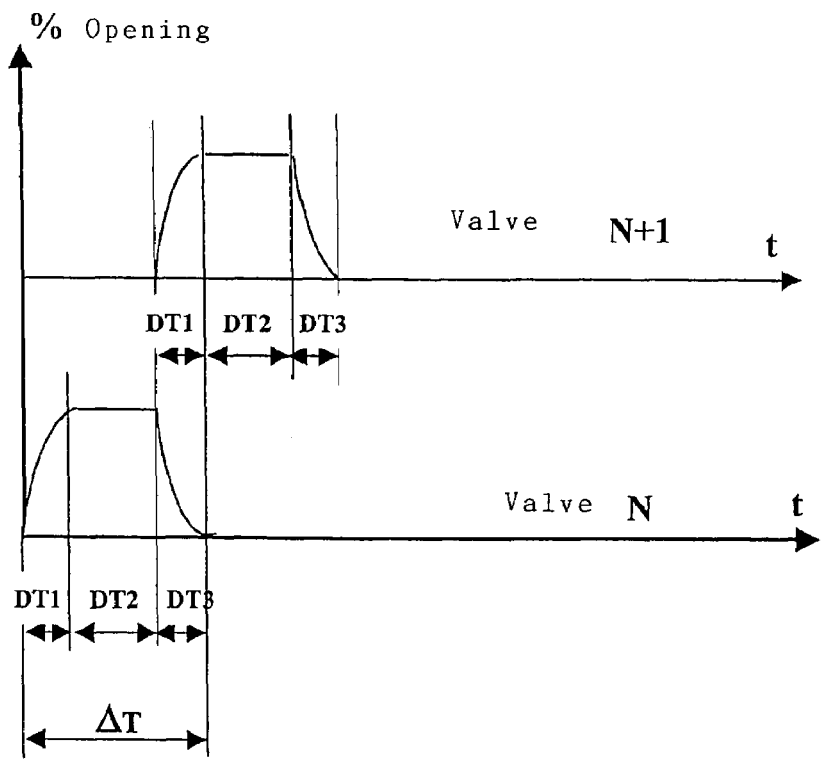
FIG. 3 shows an example of operation of a unit, the valves having an opening/closing law of the first order, and a three-stage profile.

FIG. 3 shows an opening/closing law that can be described in 3 stages:

a) a first opening stage taking place over a time DT1;

b) a second plateau stage corresponding to a valve opening level maintained for a time DT2;

c) a third valve closing stage over a time DT3.

To ensure that the sum of the flows drawn off or injected through the two consecutive valves is constant throughout the period, DT1 has to be equal to DT3.

In this case, there is an overlap between the opening of the second valve and the closing of the first valve, which is DT3 or DT1 (DT1=DT3 because of the symmetry condition).

The valve opening/closing profile is generally a profile referred to as of the first order, characterized by the time required to obtain 99% of the total opening of the valve.

Generally speaking, whatever the opening and closing law applied to all of the valves, a symmetry condition has to be met between the closing of a valve and the opening of the consecutive valve. This symmetry condition allows guarantee of the constancy of the total flow rate drawn off or injected through the whole of the two consecutive valves.

It has been discovered that, surprisingly enough, introduction of a certain overlap between two consecutive valves allows improvement of the performances of the separation unit in relation to the conventional methods of operation of this type of unit. For example, for a fixed extract purity level, the extract yield can be improved very significantly as shown in the comparative example below.

Another advantage of the invention lies in the fact that, instead of using, as it is currently the case, very fast opening and closing valves (approximately 2 seconds with the current technology of ELUXYL® units), it is possible to use valves with a relatively long opening time that can reach up to 80 or 90% of the period, the opening time of the valve being no longer a constraint but, in the present invention, a controlled parameter.

This could allow to replace the current valves by less expensive valves.

In fact, the valves currently used in the process are of "on-off" type with entire opening, with opening/closing times of the order of 2 seconds.

These valves are controlled by an electropneumatic operator, possibly aided by a pneumatic accelerator allowing obtaining the very short opening/closing times desired (of the order of seconds).

The constraint on the opening/closing time also imposes relatively costly materials for the seat of these valves which undergo shocks and have to withstand considerable mechanical wear.

Implementation of the present invention translates into a relaxing of the opening/closing constraint, replaced by a profile instruction, and allows current valves to be replaced by flow valves involving less expensive metallurgy.

COMPARATIVE EXAMPLE

The following comparative example is intended to illustrate the advantage provided by the invention. The operation of a SCC column according to the prior art and according to the variant of the invention, corresponding to the application of an opening/closing law on two consecutive valves with a controlled overlap time between the two valves, has therefore been simulated.

The conditions of the example are as follows:
number of beds: 15
number of beds per zone:
Zone 1 between the draw-off of extract (EA) and the introduction of eluent (S): 4 beds
Zone 2 between the injection of feedstock (A+B) and the draw-off of extract (EA): 5 beds
Zone 3 between the draw-off of raffinate (RB) and the injection of feedstock (A+B): 4 beds
Zone 4 between the draw-off of raffinate (RB) and the injection of eluent (S): 2 beds
Eluent flow rate: 36.6 m*3/h
Feedstock flow rate: 34.4 m*3/h
Extract draw-off rate: 22.3 m*3/h
Raffinate draw-off rate: 48.7 m*3/h
Recirculation rate: 136 m*3/h
Composition of the feedstock in % by mass:
Paraxylene: 20.3%
Meta and ortho xylene: 68.5%
Ethylbenzene: 11.1%.
Period ($\Delta T$) is 75 seconds in all the cases.

The simulation tool used is a knowledge model of this type of simulated moving bed separation unit including thermodynamic elements and kinetics elements. The thermodynamics of the system is represented by adsorption isotherms and the kinetics is represented by a dispersion coefficient specific to each constituent.

This simulator solves a conventional knowledge model as can be found in the literature accessible to those skilled in the art and knowing chromatography separation methods.

The more specific part of this model relative to valve modelling was published by D. PAVONE and G. HOTIER in the Journal Oil and Gas Science and Technology, Special issue, 2000, Vol.55 No.4, Ed. Technip, in July/August 2000.

The use of this simulator to obtain optimum operating conditions for a simulated moving bed system forms the subject of French patent 2,762,793 and corresponding U.S. Pat. No. 5,902,486 filed by the assignee.

Each connection comprises two draw-off valves and two injection valves which are flow valves controlled by a programmable controller.

The 19.5-m long column contains 48 $m^3$ adsorbent solid of zeolite type.

Four opening/closing laws are compared which apply the method (case 1, 2, 3 and 4) with a reference case (cas ref) corresponding to a conventional management of the "on-off" valves without overlap.

Case 1 corresponds to an opening law of the first order for which 99% of the valve opening is reached in 27.5 seconds, i.e. 36.7% of period $\Delta T$.

Case 2 corresponds to an opening law of the first order for which 99% of the valve opening is reached in 46 seconds, i.e. 61.3% of period $\Delta T$.

Case 3 corresponds to an opening law of the first order for which 99% of the valve opening is reached in 69 seconds, i.e. 92% of period $\Delta T$.

Case 4 corresponds to a triangle opening law as described above; opening is obtained at the end of a period.

The period is, in each case, 75 seconds and the overlap time in cases 1, 2 and 3 is respectively 47.5, 29 and 6 seconds, i.e. 63.3%, 38.7% and 8% of the period.

In case 4, the overlap time is a 75-second period.

The purity level has remained the same on the extract, i.e. 92%, and the maximum paraxylene yield in the extract was compared in each case.

It can be noted that, in relation to the reference case (ref), the paraxylene yield gain is at least 4 points, which is remarkable, and that this gain tends to increase with the time required to reach 99% of the valve opening, that is it is finally worth having a progressive opening of the valves and not, as it was the case to date, trying to limit to the minimum the opening and closing times. It is in this sense that the triangle opening and closing law represents the best valve management mode.

The fixed-purity yield gains are given in the table hereunder.

| Function used | 92% imposed purity | Maximum yield | Yield gain |
| --- | --- | --- | --- |
| Ref case without overlap | 92.0% | 85.1% | 0 |
| Case 1 1st-order function | 92.0% | 89.7% | 4.6 |
| Case 2 1st-order function | 92.0% | 90.1% | 5.0 |
| Case 3 1st-order function | 92.0% | 90.2% | 5.1 |
| Case 4 triangle function | 92.0% | 91.8% | 6.7 |

The invention claimed is:

1. A method of managing opening of valves of a simulated moving bed component separation system working under closed loop conditions with optimized flow rates, comprising at least one column of a succession of beds containing adsorbent solid, each bed being provided with connections for at least one draw-off valve and at least one injection valve, the column having at least one feed point for a feedstock containing at least one component to be separated, an extract draw-off point, a raffinate draw-off point and an eluent injection point, and being subdivided into zones each comprising beds, each zone being defined any time by a position of an injection point and of a draw-off point surrounding the zone, with all of the draw-off and injection points moving forward by one bed at predetermined time intervals, the method comprising:
selecting an opening and closing law of first and second consecutive valves, the law meeting a symmetry condition guarantying a constancy of a sum of a flow rate passing through the first valve closing according to the law and a flow rate passing simultaneously through the second valve opening according to the law; and
during a chosen overlap time, closing the first valve located at one end of one of the zones according to the law, while opening the second valve according to the law, the second valve being located downstream from the first valve in relation to a direction of recirculation flow through the zones.

2. A method as claimed in claim 1, wherein the overlap time of the first and second valves ranges between 0.05 and 1 times a time period of one of the predetermined time intervals.

3. A method as claimed in claim 2, wherein an overlap time of the first and second valves ranges between 0.2 and 1 times a time period of one of the predetermined time intervals.

4. A method as claimed in claim 3, wherein the valves used at each connection are on-off valves.

5. A the method as claimed in claim 4 comprising managing the opening and closing of the valves in the system to separate aromatic hydrocarbons with eight carbon atoms.

6. A method as claimed in claim 3, wherein the valves used at each connection are flow valves.

7. A method as claimed in claim 6 comprising managing the opening and closing of the valves in the system to separate aromatic hydrocarbons with eight carbon atoms.

8. A method as claimed in claim 3, wherein the opening and closing law has a two-stage profile: a first linear opening stage of the first order or of a higher order whose duration is equal to one period, and a second linear closing stage of the first order or of a higher order whose duration is equal to one period.

9. A method as claimed in claim 8 comprising managing the opening and closing of the valves in the system to separate aromatic hydrocarbons with eight carbon atoms.

10. A method as claimed in claim 3, wherein the opening and closing law has a three-stage profile: a first linear opening stage of a first order or of a higher order whose duration ranges between 0.4 and 0.9 times the period, a second total opening stage of the valve ranging between 0.6 and 0.1 times the period, and a third linear closing stage of the first order or a higher order whose duration is equal to that of the first stage.

11. A method as claimed in claim 10 comprising managing the opening and closing of the valves in the system to separate aromatic hydrocarbons with eight carbon atoms.

12. A method as claimed in claim 3, wherein the time ranges from 0.2 to 0.95 times a time period of one of the predetermined time intervals.

13. A method as claimed in claim 12, wherein the time ranges from 0.2 to 0.95 times a time period of one of the predetermined time intervals.

14. A method as claimed in claim 13 comprising managing the opening and closing of the valves in the system to separate aromatic hydrocarbons with eight carbon atoms.

15. A method as claimed in claim 12 comprising managing the opening and closing of the valves in the system to separate aromatic hydrocarbons with eight carbon atoms.

16. A method as claimed in claim 3 comprising managing the opening and closing of the valves in the system to separate aromatic hydrocarbons with eight carbon atoms.

17. A method as claimed in claim 2, wherein the valves used at each connection are on-off valves.

18. A method as claimed in claim 17 comprising managing the opening and closing of the valves in the system to separate aromatic hydrocarbons with eight carbon atoms.

19. A method as claimed in claim 2, wherein the valves used at each connection are flow valves.

20. A method as claimed in claim 19 comprising managing the opening and closing of the valves in the system to separate aromatic hydrocarbons with eight carbon atoms.

21. A method as claimed in claim 2, wherein the opening and closing law has a two-stage profile: a first linear opening stage of the first order or of a higher order whose duration is equal to one period, and a second linear closing stage of the first order or of a higher order whose duration is equal to one period.

22. A method as claimed in claim 21 comprising managing the opening and closing of the valves in the system to separate aromatic hydrocarbons with eight carbon atoms.

23. A method as claimed in claim 2, wherein the opening and closing law has a three-stage profile: a first linear opening stage of a the first order or of a higher order whose duration ranges between 0.4 and 0.9 times the period, a second total opening stage of the valve ranging between 0.6 and 0.1 times the period, and a third linear closing stage of the first order or a higher order whose duration is equal to that of the first stage.

24. A method as claimed in claim 23 comprising managing the opening and closing of the valves in the system to separate aromatic hydrocarbons with eight carbon atoms.

25. A method as claimed in claim 2, wherein the law is a law of the first order, wherein a time required to obtain 99% of the total opening ranges from 0.1 to 0.98 times a time period of one of the predetermined time intervals.

26. A method as claimed in claim 25, wherein the time ranges from 0.2 to 0.95 times a time period of one of the predetermined time intervals.

27. A method as claimed in claim 26 comprising managing the opening and closing of the valves in the system to separate aromatic hydrocarbons with eight carbon atoms.

28. A method as claimed in claim 25 comprising managing the opening and closing of the valves in the system to separate aromatic hydrocarbons with eight carbon atoms.

29. A method as claimed in claim 2 comprising managing the opening and closing of the valves in the system to separate aromatic hydrocarbons with eight carbon atoms.

30. A method as claimed in claim 1, wherein the valves used at each connection are on-off valves.

31. A method as claimed in claim 30 comprising managing the opening and closing of the valves in the system to separate aromatic hydrocarbons with eight carbon atoms.

32. A method as claimed in claim 1, wherein the valves used at each connection are flow valves.

33. A method as claimed in claim 32 comprising managing the opening and closing of the valves in the system to separate aromatic hydrocarbons with eight carbon atoms.

34. A method as claimed in claim 1, wherein the opening and closing law has a two-stage profile: a first linear opening stage of the first order or of a higher order whose duration is equal to one period, and a second linear closing stage of the first order or of a higher order whose duration is equal to one period.

35. A method as claimed in claim 34 comprising managing the opening and closing of the valves in the system to separate aromatic hydrocarbons with eight carbon atoms.

36. A method as claimed in claim 1, wherein the opening and closing law has a three-stage profile: a first linear opening stage of a first order or of a higher order whose duration ranges between 0.4 and 0.9 times the period, a second total opening stage of the valve ranging between 0.6 and 0.1 times the period, and a third linear closing stage of the first order or a higher order whose duration is equal to that of the first stage.

37. A method as claimed in claim 36 comprising managing the opening and closing of the valves in the system to separate aromatic hydrocarbons with eight carbon atoms.

38. A method as claimed in claim 1, wherein the opening and closing law is a law of the first order, wherein a time required to obtain 99% of total opening ranges from 0.1 to 0.98 times a time period of one of the predetermined time intervals.

39. A method as claimed in claim 38, wherein the time ranges from 0.2 to 0.95 times a time period of one of the predetermined time intervals.

40. A method as claimed in claim 39 comprising managing the opening and closing of the valves in the system to separate aromatic hydrocarbons with eight carbon atoms.

41. A method as claimed in claim 38 comprising managing the opening and closing of the valves in the system to separate aromatic hydrocarbons with eight carbon atoms.

42. A method as claimed in claim 1 comprising managing the opening and closing of the valves in the system to separate aromatic hydrocarbons with eight carbon atoms.

\* \* \* \* \*